United States Patent Office 3,297,407
Patented Jan. 10, 1967

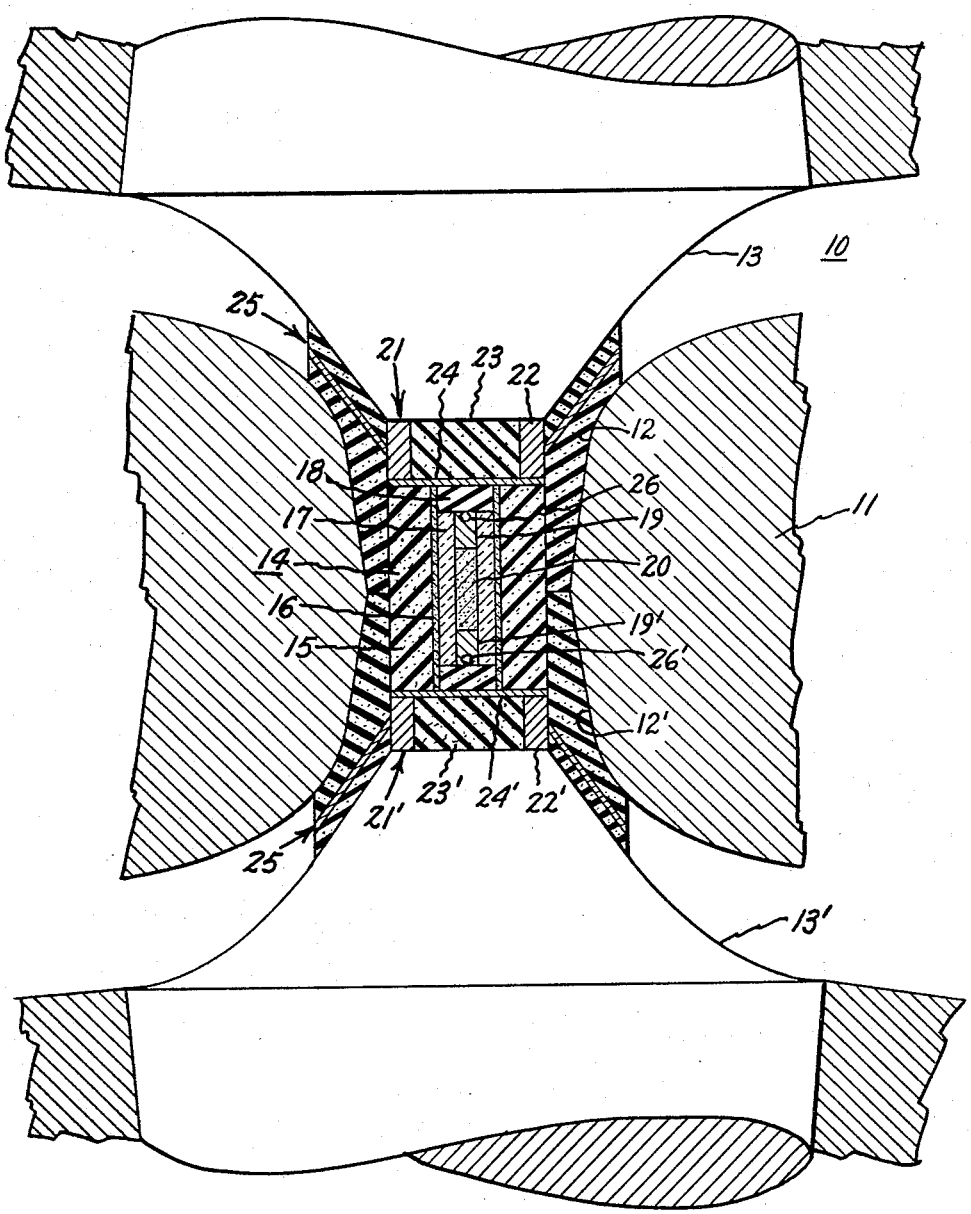

3,297,407
METHOD OF GROWING DIAMOND ON A
DIAMOND SEED CRYSTAL
Robert H. Wentorf, Jr., Schenectady, N.Y., assignor to
General Electric Company, a corporation of New York
Filed Dec. 10, 1962, Ser. No. 243,335
7 Claims. (Cl. 23—209.1)

This invention relates to diamond growth control and more particularly to control means utilized to provide growth of diamond on a diamond seed crystal.

An important feature in diamond growth generally, is control over the numerous variables, such as pressure, temperature, transitions or phase changes, and other phenomena involved in the reaction. Where some of these variables can be combined, excluded, or minimized, a greater degree of control over the remainder may be exercised in order to predetermine certain characteristics of the final diamond product. Control over the actual growth of a diamond crystal permits predetermining of larger crystals or of crystals of various sizes and shapes. It will also provide means to predetermine other characteristics, such as crystal purity and electrically conducting or semiconducting features.

Accordingly, it is an object of this invention to provide improved control over diamond growth.

It is another object of this invention to provide improved diamond growth on a seed.

It is a still further object of this invention to provide larger diamonds.

It is yet another object of this invention to eliminate phase changes in diamond growth processes.

It is still another object of this invention to provide temperature control over a diamond growth process.

Briefly described, a preferred practice of this invention includes the steps of selecting components for a reaction vessel to provide a predetermined temperature gradient therein under operating conditions; assembling these components and enclosing a charge therein, this charge comprising (a) at least one diamond seed crystal located in a region of the reaction vessel, which under operating conditions will have a temperature at or near the low end of the aforementioned temperature gradient, (b) a source of substantially pure carbon located in a region of the reaction vessel, which under operating conditions will have a temperature at or near the high end of the temperature gradient, and (c) a barrier of catalyst metal interposed between the seed diamond and the source of carbon, the catalyst metal being selected from the class consisting of the metals of Group VIII of the Periodic Table of the Elements, chromium, tantalum, manganese and alloys containing at least one of the aforementioned metals; simultaneously subjecting the reaction vessel and the charge therein both to pressure in the diamond-stable region of the phase diagram of carbon and to heat at a temperature in excess of the melting point of the metal barrier at the operating pressure, whereby carbon is first dissolved in a molten catalyst metal in the hotter part of the reaction vessel, and then precipitated from the molten catalyst metal on a diamond seed crystal in a cooler part of the reaction vessel.

This invention will be better understood when taken in connection with the following description and the drawing in which:

The drawing is a cross sectional view of one preferred reaction vessel arrangement in an exemplary high pressure high temperature apparatus.

The practice of this invention requires an apparatus capable of withstanding high pressures and high temperatures in order to provide the required growth conditions for diamond. Various apparatuses are found in the prior art which are capable of providing the conditions for the particular processes involved. As an example, one preferred high temperature, high pressure apparatus is that disclosed and claimed in U.S. Patent 2,941,248—Hall. Briefly, and as illustrated in the drawing, such an apparatus 10 includes an annular belt member 11 having a convergent divergent aperture therethrough defined by walls 12 and 12'. A pair of frustoconical oppositely positioned and movable punches 13 and 13' move into the opening to define a reaction chamber. A reaction vessel 14, containing a specimen material, is placed in the reaction chamber and compression thereof through motion of punches 13 and 13' subjects the sample material to high pressures. Electrical resistance heating is employed to attain high temperature.

Diamond crystals are grown by a high pressure, high temperature process. A preferred method of producing, growing or making diamonds is adequately disclosed and claimed in U.S. Patents 2,947,610—Hall et al. and 2,947,609—Strong et al. Briefly described, the method of making diamonds includes the subjection of a non-diamond form of carbon, for example graphite, together with a metallic catalyst-solvent to sufficiently high pressures and temperatures in the diamond forming region of the phase diagram of carbon to provide diamond growth. The catalyst-solvent is described as containing a metal, for example one of the metals of Group VIII of the periodic table of elements, chromium, manganese, and tantalum.

Apparatus 10 as described above provides a desired pressure in the diamond forming region above the graphite to diamond equilibrium line on the phase diagram of carbon. See "Diamond-Graphite Equilibrium Line From Growth and Graphitization of Diamond", F. P. Bundy et al., Journal of Chemical Physics, vol. 35, No. 2, pages 383–391, August 1961 and "Calibration Techniques in Ultra-High Pressure" as noted below. Operation of apparatus 10 includes placing the apparatus as illustrated between the platens of a suitable press and causing punches 13 and 13' to move towards each other, thus compressing a reaction vessel and subjecting the sample to high pressures. To calibrate the apparatus for high pressures, the calibration technique as given in aforementioned U.S. Patents 2,941,248 and 2,947,610 may be employed. This technique includes the subjecting of certain metals to known pressures where an electrical resistance transition of these metals is indicated. For example, during the compression of bismuth, a definite reversible electrical resistance change is noted at about 25 kilobars. By the same token then, this electrical resistance change in bismuth denotes 25 kilobars pressure. A more particular description of methods employed to determine the above transition values may be found in the publication "Calibration Techniques in Ultra-High Pressures," F. P. Bundy, Journal of Engineering for Industry, May 1961. The measurement of temperature in this reaction vessel may be accomplished by suitable temperature calibration and the insertion of thermocouples therein as described in the aforementioned patents.

It has been discovered that diamond may be grown on a diamond seed crystal under proper and predetermined conditions in a reaction vessel such as that disclosed in the drawing. More particularly, it has been discovered that a greater and improved degree of control over a diamond growth process may be exercised by localizing the growth process as diamond growth on a diamond seed crystal, and additionally by avoiding the graphite to diamond transition for the diamond growth desired and at its time and site. Growth on a diamond seed crystal is provided by dissolving diamond in molten catalyst metal and then precipitating diamond from the molten catalyst metal on a seed crystal. The diamond to be dissolved may be provided as small diamond crystals or as diamond freshly grown in situ from graphite.

This invention comprises in one form, dissolving diamond in a molten catalyst metal and precipitating diamond from the catalyst metal on a diamond seed crystal. These occurrences require a definite temperature gradient in the reaction vessel for optimum results. The temperature gradient feature is best described with respect to reaction vessel components, electrical circuitry, and an operative practice of the invention.

In the drawing, reaction vessel 14 is referred to as an indirectly heated reaction vessel of the general type more fully described in U.S. Patent 3,031,269—Bovenkerk. Briefly, reaction vessel 14 includes in one form, a pyrophyllite cylinder 15 of about 0.430 inch length. A graphite heater tube 16 is concentrically positioned within pyrophyllite cylinder 15 and is utilized as the resistance element of an electrical circuit. A liner tube 17 of alumina and end discs 18 of alumina provide a suitable barrier between the heater tube 16 and the reactants. The reactants include, in one example, metal plugs 19 and 19' in the ends of tube 17 and an intermediate filler 20 of carbonaceous material.

In order to provide an electrical circuit through reaction vessel 14 and to shield the punches 13 and 13' from high temperatures, end caps 21 and 21' are employed, one on each end of reaction vessel 14. Each end cap includes a steel ring 22, a pyrophyllite plug 23, and a thin metal disc 24. Therefore, an electrical circuit is established from a source of power (not shown) to one of the punches 13 or 13', through rings 22, discs 24, and through heater tube 16.

One method of establishing a temperature gradient varying in the axial direction of the reaction vessel is to vary the wall thickness of the heater tube 16 at a particular location so that a portion of the reaction vessel contents receives more heat through resistance heating. Another method of establishing a temperature gradient relates to changing or altering the various materials utilized in the reaction vessel components.

In the present apparatus, the disclosed arrangement of parts provides a temperature gradient which is described as follows. Heat loss from the reaction vessel 14 in a lateral direction is minimized by the pyrophyllite cylinder 15 and the pyrophyllite gasket assembly 25. Lesser resistance to heat flow is found in the vertical direction where metal to metal contact is made with the punches through discs 24 and rings 22. Additionally, the electrical resistance heating provides a greater concentration of heat in the center of the reaction vessel. Therefore, a temperature gradient in excess of about 100° C. is established between the center and ends of the reaction vessel 14.

Further evidence of the temperature gradient is observed by a method of temperature calibration of the reaction vessel. Since the melting point of, for example, nickel is known at various pressures, an assembled reaction vessel with nickel for plugs 19 and 19' is subjected to high pressures and an electrical power input just sufficient to cause melting of nickel. Thereafter, temperature and pressure are reduced and the plugs examined. After several such examples at successively higher electrical power inputs, it was noted that the inner portions only of the plugs had melted at the lower power inputs and that the zone of melting increased along the plugs towards the ends of the reaction vessel at higher power inputs. Thus, at any given power input the temperature in the reaction vessel varies from a hotter central portion to cooler end portions. The use of the temperature gradient as established is described with respect to an operative example of the practice of this invention. The reaction vessel of the drawing was assembled with a pair of iron plugs 19 and 19' of 0.090 inch diameter and about 0.120 inch length in the ends of the alumina tube 17. A quantity of diamond crystals 20 was placed in the tube 17 and tamped in position before inserting the final iron plug 19'. Iron plugs 19 and 19' are provided with a suitable aperture in which diamond seed crystals 26 and 26' are inserted.

The assembled reaction vessel as illustrated in the drawing was subjected to a pressure of about 70 kilobars and a temperature of about 1700° C. This pressure and temperature is within the diamond stable region and above the graphite-to-diamond equilibrum line on the phase diagram of carbon. Thus, in reaching these conditions, diamond seeds 26 and 26' are not graphitized but remain diamond. At the conditions indicated, a temperatures gradient is established in the manner described and the reaction of this invention commences. This reaction includes diamond 20 dissolving in iron plugs 19 and 19' and precipitating therefrom on the diamond seed crystals 26 and 26'. After about 10 minutes at these conditions, temperature and then pressure were reduced and the contents of the reaction vessel examined. The seed diamond crystals were noted to be larger by a factor of 10 over their original size. Seed crystal growth was essentially the only new growth of diamond that occurred during the reaction. In establishing the growth characteristics, several duplicate reactions were undertaken without the use of a seed crystal and microscopic examination of the reaction vessel contents revealed only negligible new diamond growth, which was traced to some graphite present in the materials utilized, and no diamond growth in the ends where a seed crystal would be positioned.

Other examples were performed similar to the above described example but where graphite was employed in place of diamond 20. In these instances growth on a diamond seed took place as in those examples where diamond 20 was employed. Some of these experiments were repeated without the use of a seed crystal and it was found that no diamond growth occurred in the seed crystal area. However, all graphite present was converted to diamond.

In the practce of this invention, it was discovered that the reaction was greatly facilitated and improved where electrical power input to the reaction vessel was varied. While A.C. power was employed in all instances, the varying of that power, for example by reducing the power by 5–10 watts and then raising the power by the same amount in about one minute was an important feature. The difference in growth between those examples utilizing varying electrical power input and constant power input was readily observable in the lesser growth of the non-variable power examples as compared to the variable power examples. No particularly critical sequence or duration of electrical power variation appeared necessary. In the practice of this invention over a 10-minute run, the electrical power has been varied up to 10 times at both even and odd time intervals and for varying durations, all with substantially improved results. A recommended practice is to vary the power by about one percent each minute.

The following are examples of specific practices of this invention:

Example 1

The reaction vessel of the drawing was assembled as illustrated with the catalyst metal plugs 19 and 19' of iron and 0.120 inch length. Diamond powder 20 as illustrated was 325 mesh and tamped in the position shown. The diamond seed crystal site 26' was seeded with about 25 crystals of 325 mesh diamond (30 to 60 microns) which were positioned generally in the bottom of the tube 17 and somewhat surrounding iron plug 19'. Pressure and temperature were then raised to about 67 kilobars and 1700° C. at the hottest part of the reaction vessel. These conditions were maintained for about 10 minutes, and temperature and then pressure were reduced. Several of the diamond seed crystals were recovered from their original position and found to be about 300 millimeters in the longer dimension.

Example 2

The reaction vessel of the drawing was assembled as illustrated with catalyst metal plugs 19 and 19' of nickel and 0.120 inch length. Diamond powder 20 was 325 mesh and tamped in position as illustrated. Diamond seed included about 25 crystals of 325 mesh diamond and positioned in the bottom of the tube 17 somewhat around plug 19'. Pressure and temperature were raised to about 67 kilobars and 1700° C. at the hottest part of the reaction vessel. These conditions were maintained for about 10 minutes with electrical power input variation of 10 watts each minute, and temperature and then pressure were reduced. Diamond seed crystals were recovered from the reacton vessel and found to be about 300 to 400 microns in their longest dimension with diamonds growing somewhat needle-like from the side walls of the tube 17 near the bottom thereof.

Example 3

The reaction vessel of the drawing was assembled as illustrated with catalyst metal plugs 19 and 19' of nickel and 0.120 inch length. Graphite material in the form of spectroscopic purity carbon rod of approximately 0.210 inch length was utilized instead of diamond 20. As diamond seed crystals, several 325 mesh diamond crystals were placed at one end of the tube 17 being adjacent the end discs 18 and slightly up the side walls of tube 17. Pressure and temperature were then raised to about 67 kilobars and 1700° C. at the hottest part of the reaction vessel. Electrical power variation was a decrease and increase of 10 watts per minute. These conditions were maintained for about 10 minutes, then temperature and pressure were reduced. Diamond seed crystals of about 300 millimeters in the longest dimension were recovered from their original positions in the reaction vessel.

Example 4

The reaction vessel of the drawing was assembled as illustrated with metal plugs 19 and 19' of iron of 0.120 inch length. Graphite powder was tamped into a rod of about 0.210 inch length in the position of and in place of diamond 20. Several diamond seed crystals of 325 mesh diamonds were positioned at the ends of tube 17. Pressure and temperature were raised to about 60 kilobars and 1600° C. in the hottest part of the reaction vessel. Electrical power input was varied by about 10 watts per minute. These conditions were maintained for about 8 minutes and then temperature and pressure were reduced. Diamond seed crystals were recovered from their original position about the metal plug and found to be about 200 to 400 microns in the longest dimension.

Example 5

The reaction vessel of the drawing was utilized with catalyst metal plugs 19 and 19' of Nichrome alloy (80 Ni, 20 Cr) of about 0.120 inch length. Instead of the diamond powder a spectrographic graphite rod of 0.210 inch diameter was placed in position as illustrated. Diamond seed crystals comprising about 10 to 100 of 325 mesh diamonds were positioned in the ends of tube 17. Pressure and temperature were raised to about 60 kilobars and 1600° C. in the hottest part of the reaction vessel. Electrical power variation was employed. These conditions were maintained for about 8 minutes and then the temperature and pressure were reduced. The diamond seed crystals were recovered from the original position and were about 200 to 400 microns in their longest dimension.

By the practice of this invention, as evidenced by the above examples, the size and value of small diamond particles may be augmented. Although some graphite is formed, apparently by precipitation from the melt or by decomposition of a carbide upon cooling, maintenance of the pressures and temperatures within the defined range produce the main effect of dissolving smaller diamonds and growing larger ones. The experimental conditions are preferably chosen so that the hottest diamond crystals are thermodynamically stable although the reluctance of diamond to graphitize at high pressure might permit somewhat higher temperatures to be used as long as the growing diamond crystals are thermodynamically stable. When all the diamond present is thermodynamically stable, the main driving force for the recrystallization is the thermal gradient and the temperature based upon the difference of solubility of carbon in the melt.

The practice of this invention utilizing diamond powder 20 as the source of carbon eliminates the reaction or transition of graphite to diamond and at the same time eliminates the reduction in volume caused by this transformation. Where the source of carbon is graphite the graphite to diamond transition takes place before the practice of this invention takes place, i.e., diamond is first grown from the graphite. Therefore, the graphite to diamond transition takes place in a different period of time and at a different locale. Any deleterious effect of the graphite to diamond transition is thus avoided or minimized.

In the practice of this invention as given in the foregoing examples, diamond seeds may be placed in either end of the reaction vessel. The diamond seed crystals in the lower end do not appear to have a great tendency to float upwards but rather adhere to the alumina liner. In this connection, diamond crystals from diamond 20 also do not generally detach and float nearer the cooler end of the reaction vessel to act as seeds, but stay in a somewhat bonded mass.

The precipitation occurs on the exposed portion of the seed, i.e., those portions for example not adjacent the alumina. Thus, predetermined diamond configurations may be provided as well as growth upon discrete surfaces or portions of a diamond crystal by masking practices. In this connection, the use of a semiconducting diamond as the source of carbon leads to a semiconducting diamond growth.

During operation of the high pressure, high temperature appaartus of this invention, the reaction vessel as described undergoes little deformation at the pressures indicated. Therefore, in connection with the small amount of deformation, the relatively large metal plugs provide an extensive barrier so that the diamond powder 20 remains in its illustrated position. At the high pressure, high temperature conditions, the catalyst metal is in the molten condition and in order for the diamond to be precipitated on the seed crystal, carbon must dissolve in the reservoir of metal, to be transported therethrough and precipitate upon the seed. After recovery of the reaction vessel from the apparatus, the contents remain in the relative position as shown in the drawing, with the exception that the diamond seeds are larger and in some instances further diamond growth may be provided where excess graphite is found.

While a specific method and apparatus in accordance with this invention is described and shown, is is not intended that the invention be limited to the particular description nor to the particular configurations illustrated, and it is intended by the appended claims to cover all modifications within the spirit and scope of this invention.

What I claim as new and desire to secure by Letters Patent of the United States is:

1. A method of growing diamonds at high pressures and high temperatures above the graphite-to-diamond equilibrium line on the phase diagram of carbon which comprises the steps of:

selecting components for a reaction vessel to provide a predetermined temperature gradient therein under operating conditions; assembling said components and enclosing a charge therein, said charge comprising:

(a) at least one diamond seed crystal located in a region of said reaction vessel, which under operating conditions will be at a temperature near the minimum value of temperature for said temperature gradient, (b) a source of substantially pure carbon located in a region of said reaction vessel, which under operating conditions will be at a temperature near the maximum value for said temperature gradient, and (c) a barrier of catalyst metal interposed between said diamond seed crystal and said source of carbon, said catalyst metal being selected from the class consisting of the metals of Group VIII of the Periodic Table of the Elements, chromium, tantalum, manganese and alloys containing at least one of the aforementioned metals;

simultaneously subjecting said reaction vessel and said charge to pressure in the diamond-stable region of the phase diagram of carbon and to heat at a temperature in excess of the melting point of said metal barrier at the operating pressure whereby carbon is dissolved in the molten metal in the hotter region of said reaction vessel and then percipitated as new diamond growth on said diamond seed crystal, and recovering said seed crystal.

2. The method as recited in claim 1 wherein the metal barrier includes iron.

3. The method as recited in claim 1 wherein the metal barrier includes nickel.

4. The method as recited in claim 1 wherein the metal barrier includes a nickel-chromium alloy.

5. The method as recited in claim 1 wherein the source of carbon is diamond.

6. The method as recited in claim 1 wherein the source of carbon is graphite.

7. The method as recited in claim 1 wherein the pressure and the temperature are about 60 to 70 kilobars and 1600 to 1800° C., respectively.

References Cited by the Examiner
UNITED STATES PATENTS

| | | | |
|---|---|---|---|
| 2,947,610 | 8/1960 | Hall et al. | 23—209.1 |
| 3,031,269 | 4/1962 | Bovenkerk | 23—209.1 |
| 3,124,422 | 3/1964 | Custers et al. | 23—209.1 |
| 3,142,539 | 7/1964 | Brinkman et al. | 23—209.1 |

OTHER REFERENCES

Bovenkerk et al., "Nature," vol. 184, October 10, 1959, pages 1094–1098.

OSCAR R. VERTIZ, *Primary Examiner.*

E. J. MEROS, *Assistant Examiner.*